(12) United States Patent
Besse et al.

(10) Patent No.: US 12,097,947 B2
(45) Date of Patent: Sep. 24, 2024

(54) PROPULSION UNIT WITH FOLDABLE PROPELLER BLADES AND METHOD FOR FOLDING THE BLADES

(71) Applicant: SAFRAN HELICOPTER ENGINES, Bordes (FR)

(72) Inventors: Jean-Louis Robert Guy Besse, Moissy-Cramayel (FR); Camel Serghine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 27 days.

(21) Appl. No.: 18/001,617

(22) PCT Filed: Jun. 14, 2021

(86) PCT No.: PCT/FR2021/051058
§ 371 (c)(1),
(2) Date: Dec. 13, 2022

(87) PCT Pub. No.: WO2021/255374
PCT Pub. Date: Dec. 23, 2021

(65) Prior Publication Data
US 2023/0249812 A1    Aug. 10, 2023

(30) Foreign Application Priority Data
Jun. 16, 2020 (FR) ...................................... 2006281

(51) Int. Cl.
*B64C 27/50*   (2006.01)
*B64C 11/06*   (2006.01)
(Continued)

(52) U.S. Cl.
CPC .............. *B64C 11/28* (2013.01); *B64C 11/06* (2013.01); *B64C 27/28* (2013.01); *B64C 27/50* (2013.01);
(Continued)

(58) Field of Classification Search
CPC ......... B64C 11/28; B64C 11/06; B64C 27/28; B64C 27/50; B64C 29/02; B64C 29/00; B64C 29/0008
See application file for complete search history.

(56) References Cited

U.S. PATENT DOCUMENTS 866,369 A  *  9/1907  Learnard ................... B63H 1/24
                                              416/142
2,925,130 A  *  2/1960  Buivid .................... B64C 27/50
                                              416/143
(Continued)

FOREIGN PATENT DOCUMENTS

DE          2854977 C2  *  6/1990
WO      2017/162561 A1      9/2017

OTHER PUBLICATIONS

International Search Report mailed Oct. 12, 2021, issued in corresponding International Application No. PCT/FR2021/051058, filed Jun. 14, 2021, 5 pages.
(Continued)

*Primary Examiner* — Justin D Seabe
*Assistant Examiner* — Ayne A Lambert
(74) *Attorney, Agent, or Firm* — CHRISTENSEN O'CONNOR JOHNSON KINDNESS PLLC

(57) ABSTRACT

A propulsion unit with a propeller includes a nacelle; a propeller rotatably mounted in the nacelle by means of a hub. The propeller has blades mounted in a blade cuff that is pivotable about a pitch axis relative to the hub. Each blade is pivotable relative to the cuff about a folding axis. A folding device includes an actuator for folding the blades. The folding device includes a control member rotationally affixed to the blade cuff and driven by the actuator. A connecting rod is pivotably mounted, on the one hand, on a root the associated blade and, on the other hand, on the movable control member.

8 Claims, 13 Drawing Sheets

(51) Int. Cl.
  *B64C 11/28* (2006.01)
  *B64C 27/28* (2006.01)
  *B64C 29/02* (2006.01)
  *B64D 29/00* (2006.01)
  *B64C 29/00* (2006.01)

(52) U.S. Cl.
  CPC .............. *B64C 29/02* (2013.01); *B64D 29/00* (2013.01); *B64C 29/0008* (2013.01)

(56) References Cited

U.S. PATENT DOCUMENTS

| | | | | |
|---|---|---|---|---|
| 3,343,610 | A * | 9/1967 | Vacca | B64C 27/50 416/142 |
| 3,356,155 | A * | 12/1967 | Ferris | B64C 27/50 416/143 |
| 3,592,412 | A * | 7/1971 | Glatfelter | B64C 29/0033 416/142 |
| 3,749,515 | A * | 7/1973 | Covington | B64C 27/50 416/143 |
| 3,957,229 | A * | 5/1976 | Davis | B64C 11/28 416/142 |
| 4,427,341 | A * | 1/1984 | Eichler | B63H 1/14 416/142 |
| 4,466,775 | A * | 8/1984 | Martin | B64C 27/50 416/158 |
| 4,738,592 | A * | 4/1988 | Cavanaugh | B64C 27/50 416/142 |
| 6,308,632 | B1 * | 10/2001 | Shaffer | F04D 29/36 102/388 |
| 7,857,590 | B1 * | 12/2010 | Neal | B64C 27/50 416/142 |
| 8,998,125 | B2 * | 4/2015 | Hollimon | B64C 29/0033 244/6 |
| 2010/0072325 | A1 * | 3/2010 | Sambell | B64C 11/28 244/7 A |
| 2015/0266571 | A1 * | 9/2015 | Bevirt | B64C 29/0033 244/7 C |
| 2015/0274290 | A1 * | 10/2015 | Fenny | B64C 27/30 244/17.25 |
| 2016/0152329 | A1 * | 6/2016 | Tzeng | B64C 11/28 29/889.1 |
| 2017/0144746 | A1 * | 5/2017 | Schank | B64D 27/20 |
| 2018/0079499 | A1 * | 3/2018 | Foskey | B64C 11/28 |
| 2018/0312251 | A1 * | 11/2018 | Petrov | B64C 27/28 |
| 2019/0016441 | A1 | 1/2019 | Schank et al. | |
| 2019/0061914 | A1 * | 2/2019 | Heranger | B64C 11/06 |
| 2020/0180756 | A1 * | 6/2020 | Kapeter | B64C 29/0033 |
| 2022/0126981 | A1 * | 4/2022 | Choi | B64C 11/04 |

OTHER PUBLICATIONS

Written Opinion mailed Oct. 12, 2021, issued in corresponding International Application No. PCT/FR2021/051058, filed Jun. 14, 2021, 7 pages.

English translation of Written Opinion mailed Oct. 12, 2021, issued in corresponding International Application No. PCT/FR2021/051058, filed Jun. 14, 2021, 6 pages.

International Preliminary Report on Patentability mailed Dec. 13, 2022, issued in corresponding International Application No. PCT/FR2021/051058, filed Jun. 14, 2021, 8 pages.

* cited by examiner

PROPULSION UNIT WITH FOLDABLE PROPELLER BLADES AND METHOD FOR FOLDING THE BLADES

FIELD OF THE DISCLOSURE

The disclosure relates to a propulsion unit with propeller for an aircraft comprising:
- a nacelle which is intended to be attached to a structural element of the aircraft;
- a propeller which is rotatably mounted in the nacelle about a longitudinal axis of rotation by means of a hub, the propeller comprising blades each of which is mounted to and pivotally fixed relative to an associated blade cuff which is pivotally mounted about a radial pitch axis with respect to the hub, and each blade being pivotally mounted with respect to the blade cuff about a folding axis orthogonal to the radial pitch axis;
- a folding device which comprises a folding actuator controlling the pivoting of each blade relative to its blade cuff between a deployed position in which the blades extend radially with respect to the axis of rotation and a folded position in which the blades extend generally longitudinally against the nacelle.

BACKGROUND

Such propeller propulsion units are used, for example, in vertical take-off and landing aircraft, also referred to as "VTOL". Of course, it is also possible to use such propulsion units in stationary-wing aircraft, also referred to as "CTOL", which stands for "Classic Take Off and Landing". In this scope, it is possible to equip the aircraft with several propeller propulsion units so as to distribute the thrust centers and seek the best propulsive efficiency on the aircraft.

These propeller propulsion units can be deactivated depending on the flight configuration of the aircraft. When propeller propulsion units are deactivated, their propeller is likely to adversely affect the aerodynamic performance of the aircraft, for example by creating a drag force, or by creating local disturbances in the flows of air.

To solve this problem, propulsion units equipped with foldable blade propellers have already been proposed in order to remove these non-active blades from the local flow.

However, the existing folding devices are likely to exert a force on the folding axis of the blades when the folding is accidentally triggered while the latter are not in a determined folding pitch position. Such a device is for example disclosed in the document WO 2017/162561 A1.

The document US 2019/016441 A1 discloses a folding device comprising a control member formed by a lever mounted on a blade cuff which cooperates with a first link connected to the blade and actuated by a swashplate actuator by means of a second link.

SUMMARY

The disclosure proposes a propulsion unit having a propeller for an aircraft comprising:
- a nacelle which is intended to be attached to a structural element of the aircraft;
- a propeller which is rotatably mounted in the nacelle about a longitudinal axis of rotation by means of a hub, the propeller comprising blades each of which is mounted to and pivotally fixed relative to an associated blade cuff which is pivotally mounted about a radial pitch axis with respect to the hub, and each blade being pivotally mounted with respect to the blade cuff about a folding axis orthogonal to the radial pitch axis;
- a folding device which comprises a folding actuator controlling the pivoting of each blade relative to its blade cuff between a deployed position in which the blades extend radially with respect to the axis of rotation and a folded position in which the blades extend generally longitudinally against the nacelle;
- the folding device comprising a transmission associated with each blade, each transmission comprising a movable control member which is mounted to and fixed in rotation relative to the blade cuff and which is moved by the folding actuator, and a link comprising a first end mounted so as to pivot on a root of the associated blade in an eccentric manner with respect to the folding axis and a second end mounted so as to pivot on the movable control member,
- characterized in that the movable control member is formed by a crank which is pivotally mounted in the blade cuff around a control axis parallel to the folding axis, and in that the pivoting of the movable control member is actuated by means of a gearing between a toothed sector of the crank and a rack which is mounted so as to slide longitudinally and driven by the folding actuator.

Such a folding device allows to ensure that the link will solicit the blade to pivot about its folding axis, without forcing on the latter, regardless of the pitch angular position of the blade.

According to another characteristic of the propulsion unit according to the disclosure, all the racks of each of the transmissions are attached to a common rod of the folding actuator which is slidable along the axis of rotation between a first position corresponding to the deployed position of the blades and a second position corresponding to the folded position of the blades.

According to another characteristic of the propulsion unit according to the disclosure, it comprises a device for detecting the position of the actuator rod in its first position and second position. This characteristic allows the pilot and/or the electronic control unit of the aircraft to know the position of the blades of the propeller and, if where appropriate, to detect a malfunction.

According to another characteristic of the propulsion unit according to the disclosure, it comprises a device for mechanically locking the actuator rod in its first position and in its second position. This characteristic allows to ensure that the blades remain in their deployed or folded position, preventing any unintentional pivoting of the blades.

The disclosure also relates to a method for folding the blades of a propeller of a propulsion unit made according to the teachings of the disclosure, characterized in that it comprises a folding step during which the blades are folded by means of the folding device, then a checking step of the folding, during which it is checked that the blades are indeed folded by means of the detection device.

According to another characteristic of the method, if, in the checking step of the folding, the blades are detected as being in a folded position, the mechanical locking device is controlled to lock the blades in the folded position.

DESCRIPTION OF THE DRAWINGS

Further characteristics and advantages of the disclosure will become apparent from the following detailed description, for the understanding of which reference is made to the attached drawings in which.

DETAILED DESCRIPTION

In the following description, elements with an identical structure or similar functions will be referred to by a same reference.

In the remainder of the description, a longitudinal orientation will be adopted, as indicated by the arrow "L" in the figures, which is associated locally with each of the propulsion units. The longitudinal direction is directed from front to back and is parallel to the axis of rotation of the propeller of a propulsion unit.

A radial orientation shall be used which is directed orthogonally to the longitudinal direction and which is directed from the inside near the axis of rotation of the propeller outwards. A tangential direction, which is directed orthogonally to a radial direction and the longitudinal direction, is also used.

Figure 1:
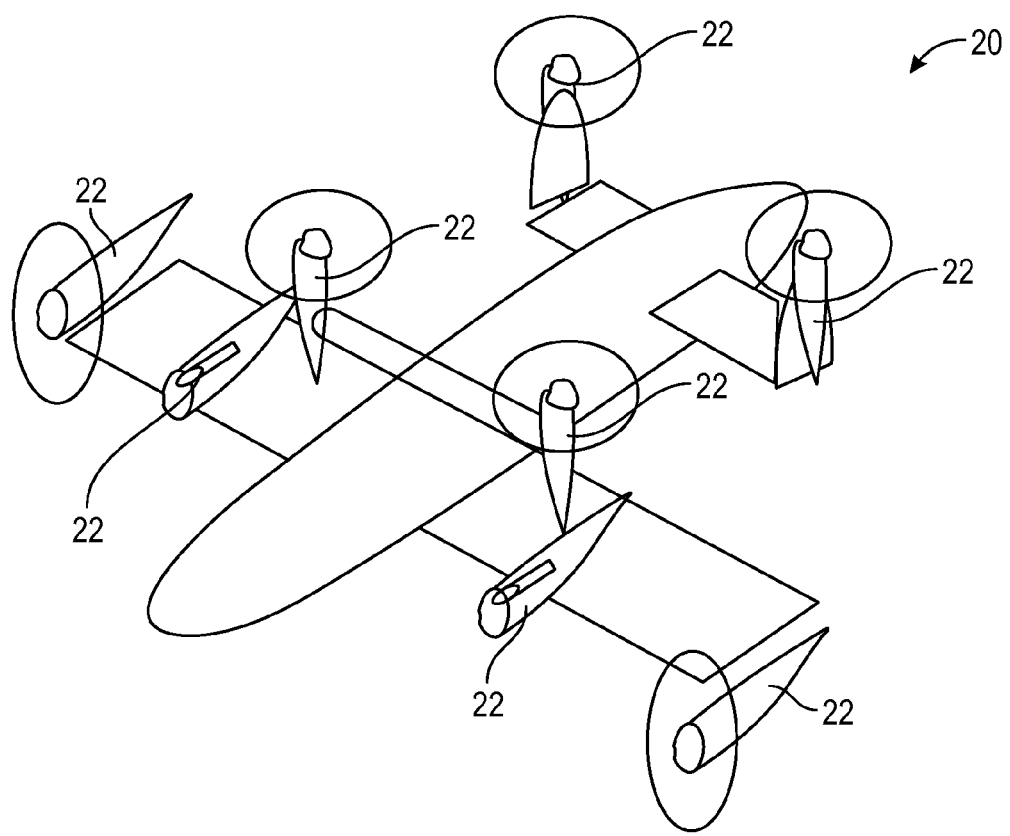
FIG. 1 is a perspective view of an aircraft equipped with several propulsion units with propeller made in accordance with the teachings of the disclosure.

FIG. 1 shows an aircraft 20 comprising several propeller propulsion units 22 made in accordance with the teachings of the disclosure. This is a Vertical Take-Off and Landing aircraft, also referred to as by its acronym "VTOL". In this respect, the aircraft 20 comprises propulsion units 22, referred to as "lift", which are intended to provide a vertical thrust of lift to the aircraft 20. These lift propulsion units 22 are here arranged on a empennage of the aircraft 20 as well as on a fuselage of the aircraft 20. The aircraft 20 also comprises propulsion units 22, referred to as traction, which are intended to provide a longitudinal thrust to allow the aircraft 20 to displace forward. The traction propulsion units 22 are here arranged on a wing of the aircraft 20.

Alternatively, the disclosure is applicable to a classic aircraft, also referred to as by its acronym "CTOL" for "Classic Take Off and Landing". The aircraft then comprises only traction propulsion units.

Figure 2:
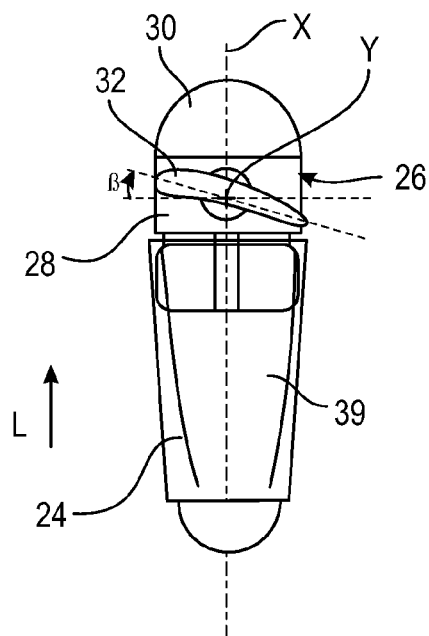
FIG. 2 is a profile view showing a lift propulsion unit of the aircraft of FIG. 1 in which the blades of the propeller are deployed in a pitch angular position allowing a lifting thrust.
Figure 3:
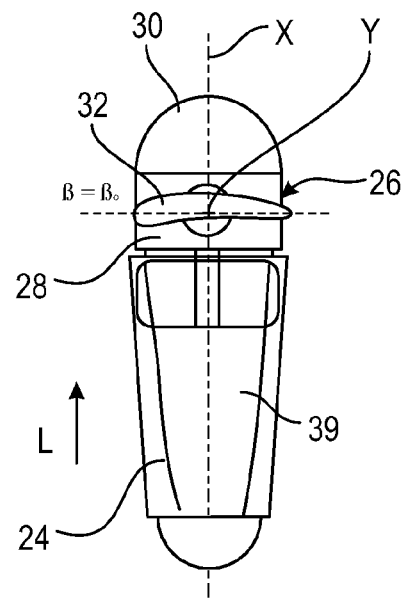
FIG. 3 is a similar view to FIG. 2 in which the blades of the propeller are deployed in a folding pitch angular position.
Figure 4:
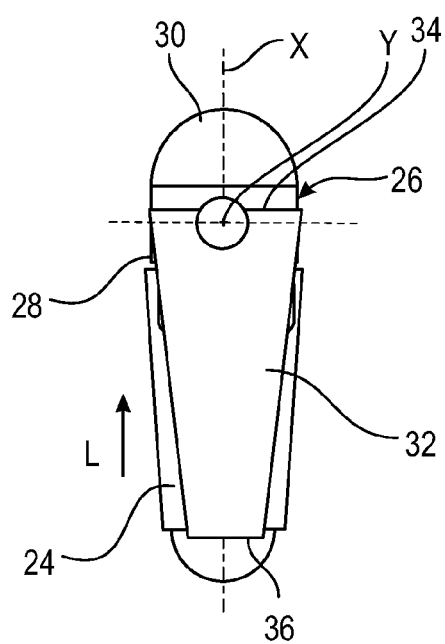
FIG. 4 is a similar view to FIG. 2 in which the blades of the propeller are folded.

The propulsion units 22 have a similar design. Thus, a single propulsion unit 22 will be described hereafter, the description being applicable to other propulsion units 22. As shown in FIGS. 2 to 4, the propulsion unit 22 comprises a nacelle 24 which is intended to be mounted on a structural element of the aircraft 20, for example a wing or the fuselage. The propulsion unit 22 is for example attached to the structural element by means of a mast (not shown). The nacelle 24 is equipped with an aerodynamic fairing.

The nacelle 24 may be mounted stationary on the structural element. When the structural element is stationary, the propulsion unit is stationary with respect to the fuselage of the aircraft, forming either a traction propulsion unit or a lift propulsion unit. When the structural element is pivotally mounted with respect to the fuselage of the aircraft, the propulsion unit alternately performs a traction or lift function depending on the position of the structural element.

According to another variant of the disclosure, the nacelle is pivotally mounted about a transverse axis on the structural element, the propulsion unit being able to alternately fulfil a traction or lift function depending on the angular position of the nacelle on the structural element.

The propulsion unit 22 further comprises a propeller 26 which is rotatably mounted in the nacelle 24 about a longitudinal axis "X" of rotation by means of a central hub 28. The front of the hub 28 is generally capped with a nose 30 to improve the aerodynamic performance of the propulsion unit 22, in particular by reducing its drag force.

The propeller 26 also comprises a plurality of blades 32 which extend along a main axis from a root 34 by which the blade 32 is linked to the hub 28 up to a free end 36 referred to as blade tip. Each blade 32 has a profile running from a leading edge to a trailing edge in the direction of rotation of the propeller 26. Each propeller 26 comprises two blades 32. The disclosure is of course applicable to propellers comprising a larger number of blades, for example three, four or more blades.

The blades 32 are evenly distributed around the hub 28 with a determined angular pitch so that the propeller 26 has a rotational invariance of the given angular pitch around the axis "X" of rotation.

Each blade 32 is pivotable relative to the hub 28 about a radial pitch axis "Y" which is substantially coincident with the main axis of the blade 32 when the propeller 26 is deployed, as will be explained later. For this purpose, the hub 28 comprises as many blade cuffs 38 as the propeller 26 comprises blades 32 as shown in FIGS. 5 to 9. Each blade cuff 38 is pivotally mounted on the hub 28 about the pitch axis "Y". Each blade cuff 38 is for example pivotally guided by means of rolling bearings. Each blade cuff 38 is in the form of a sleeve which receives the root 34 of an associated blade 32 such that the blade 32 is mounted to and fixed in rotation relative to the blade cuff 38 about the pitch axis "Y".

The blades 32 are thus controllable in a pitch angular position "β" about the pitch axis "Y" over a range that extends between a first extreme pitch angular position "β1" and a second extreme pitch angular position "β2". The thrust produced by the rotation of the propeller 26 is determined according to the pitch angular position "β" of the propeller. The range comprises a folding pitch angular position "β0" for which the blade 32 is feathered.

Thus, for a lift propulsion unit 22, the folding pitch angular position "β0" corresponds to an orientation for which the blades 32 extend in a plane orthogonal to the axis of rotation "X", also referred to as zero bearing capacity pitch angular position, as illustrated in FIGS. 3 and 4.

Figure 11:
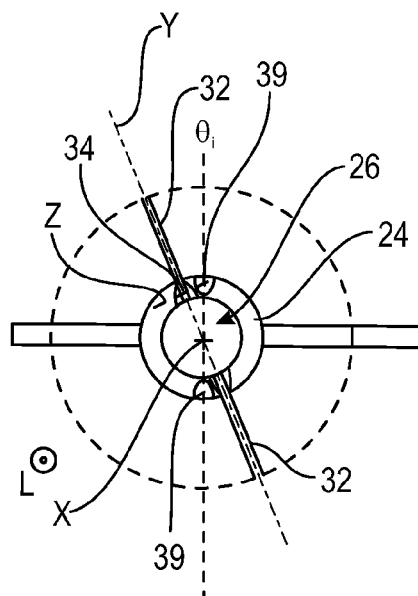
FIG. 11 is a similar view to FIG. 10 which shows the blades of the propeller deployed in a folding pitch angular position, with the propeller occupying any angular position about its axis of rotation.
Figure 12:
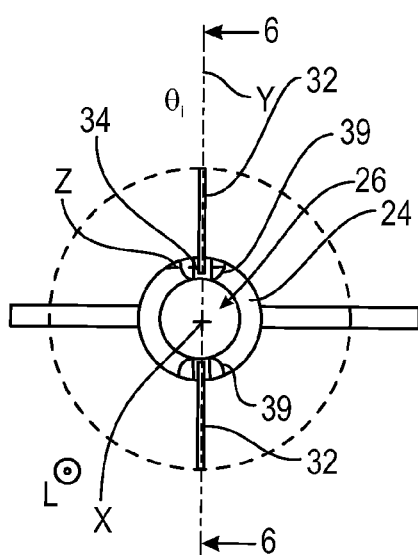
FIG. 12 is a similar view to FIG. 11 which shows the blades of the propeller deployed in a folding pitch angular position, with the propeller occupying an indexed angular position about its axis of rotation.
Figure 13:
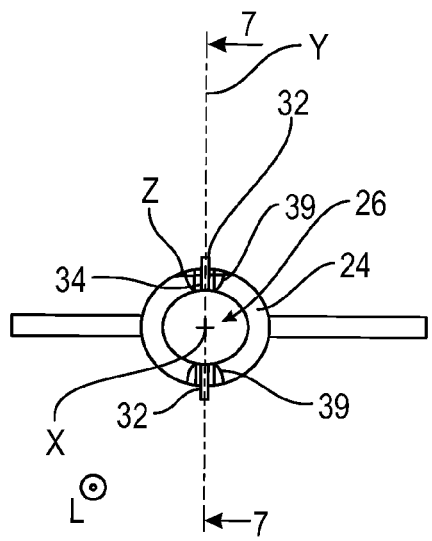
FIG. 13 is a similar view to FIG. 12, which shows the blades of the propeller folded into housings in the nacelle.

In contrast, for a traction propulsion unit 22, the folding pitch angular position "β0" corresponds to an orientation for which the blades 32 extend in a plane parallel to the axis of rotation "X", the blades 32 being "feathered", as illustrated in FIGS. 11 to 13, as well as in FIGS. 6 to 9.

Furthermore, the propeller 26 of each of the propulsion units 22 has the particularity of having foldable blades 32. In particular, this allows to improve the aerodynamic performance of the aircraft 20 under certain flight conditions, for example by folding the blades 32 of the propulsion units 22 when the aircraft 20 is flying at a speed sufficient for its wing to provide the lift force alone.

To this end, each blade 32 is pivotally mounted with respect to the associated blade cuff 38 about a folding axis "Z" which extends orthogonally to the radial pitch axis "Y" of the blade 32, as shown in FIGS. 5 to 9. Thus, the folding axis "Z" rotates together with the blade cuff 38 around the pitch axis "Y". More particularly, the blade 32 is hinged to the blade cuff 38 such that the folding axis "Z" is orthogonal to the axis "X" of rotation when the blade 32 occupies its folding pitch angular position "β0".

The blades 32 of the propeller 26 are thus controllable between a deployed position in which the main axis of the blades 32 extends generally radially with respect to the axis "X" of rotation, as shown in FIGS. 2, 3, 5, 6, 8 and 10 to 12, and a folded position in which the main axis of the blades 32 extends generally longitudinally, parallel to the axis "X" of rotation, as shown in FIGS. 4, 7, 9 and 13. In the folded position, the blades 32 are received longitudinally against the nacelle 24.

Advantageously, in order to reduce the drag force of the propulsion unit 22 when the blades 32 are in the folded position, the nacelle 24 comprises housings 39 which are each intended to house a blade 32 of the propeller 26 in its folding pitch angular position "β0", as shown in FIGS. 2 to 4 and 10 to 13. The blades 32 in the folded position are thus integrated into the fairing of the nacelle 24. For this purpose, the nacelle 24 comprises as many housings 39 as the propeller 26 comprises blades 32.

To control the pitch angular position "β" of the blades 32, the propulsion unit 22 comprises a pitch device 40, visible in FIGS. 5 to 9, which controls the pivoting of the blade cuffs 38 about the radial pitch axis "Y" relative to the hub 28 to determine the pitch angular position "β" of each blade 32. Here, the pitch device 40 allows all the blades 32 of the propeller 26 to be controlled simultaneously to a same pitch angular position "β".

The pitch device 40 comprises in particular a pitch actuator 42 which comprises a control rod 44 sliding along its main axis coaxial to the axis of rotation "X". This is a linear electric actuator 42. Alternatively, the pitch actuator can also be a hydraulic or electro-hydraulic actuator. A radial plate 46 is attached to the free end of the control rod 44. Each blade 32 of the propeller 26 is connected to the plate 46 by means of a control link 48 which has a first end mounted in an articulated manner on the plate 46 and a second end mounted in an articulated manner on the blade cuff 38 in an eccentric manner with respect to the pitch axis "Y" so as to make a link/crank connection between the plate 46 and the blade 32. Thus, the pitch angular position "β" of the blades 32 varies with the axial position of the control rod 44.

Here, the pitch actuator 42 is rotatably mounted in a fixed manner with the propeller 26. The pitch actuator 42 is for example arranged inside the nose 30.

In a variant, not shown in the disclosure, the pitch actuator is mounted stationary with respect to the nacelle, only the control plate 46 being mounted in a rotatably fixed manner with the propeller 26.

Advantageously, the propulsion unit 22 comprises means for determining the pitch angular position "β". This is, for example, a pitch sensor 45 that allows to detect the longitudinal position of the rod 44. The pitch sensor 45 is for example an inductive sensor.

To control the blades 32 between their deployed position and their folded positions, the propulsion unit 22 comprises a folding device 50 which comprises an actuator 52 controlling the pivoting of each blade 32 relative to its blade cuff 38 between its deployed and folded positions, as shown in FIGS. 5 to 9. The folding actuator 52 is here common to all the blades 32 so that the blades 32 are controlled simultaneously between their deployed position and their folded position. The folding actuator 52 is here formed by an electric actuator.

The folding device 50 comprises a transmission 54 associated with each blade 32 which functions to transmit the movement of the folding actuator 52 to the blades 32. Each transmission 54 comprises a movable control member 56 which is mounted in a rotationally fixed manner to the associated blade cuff 38 and which is moved by the folding actuator 52. Each transmission 54 further comprises a link 58 which comprises a first end pivotally mounted on the root 34 of the associated blade 32 eccentrically with respect to the folding axis "Z" and a second end pivotally mounted on the movable control member 56. The link 58 forms a link/crank connection with the blade root 34, which allows the movement of the control member 56 to be transformed into a pivoting movement of the blade 32 about its folding axis "Z". For this purpose, the two ends of the link 58 are mounted so that they can pivot about two axes parallel to the folding axis "Z".

Figure 8:
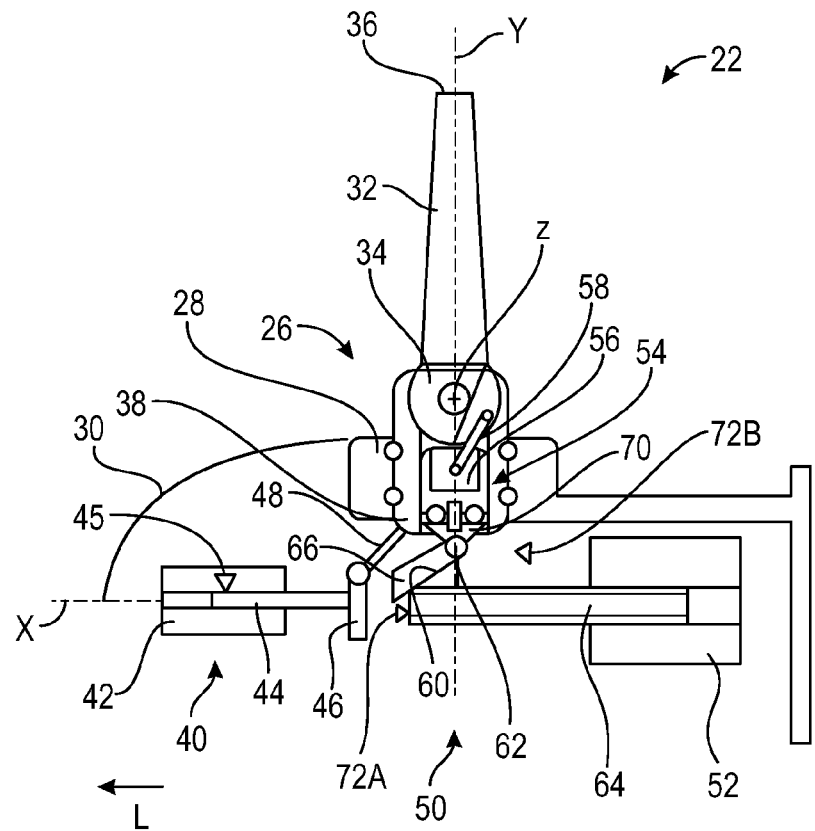
FIG. 8 is a similar view to FIG. 6 in which the traction propulsion unit is equipped with a folding device made according to a second embodiment.
Figure 9:
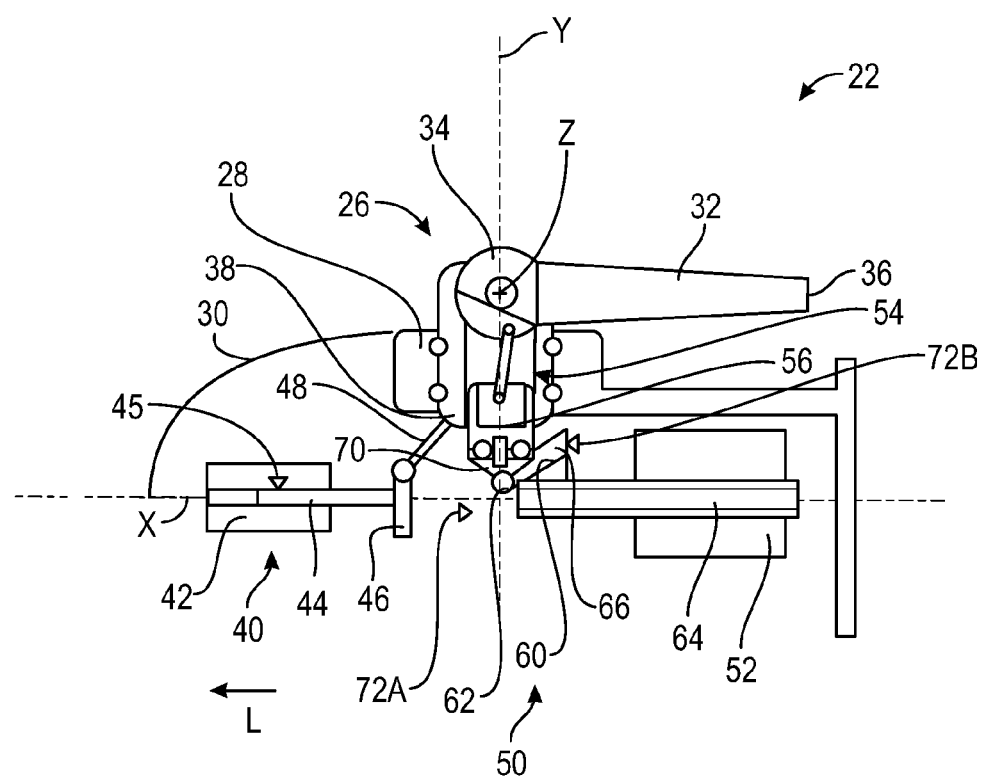
FIG. 9 is a similar view to FIG. 7 in which the traction propulsion unit is equipped with the folding device made according to the second embodiment.
Figure 10:
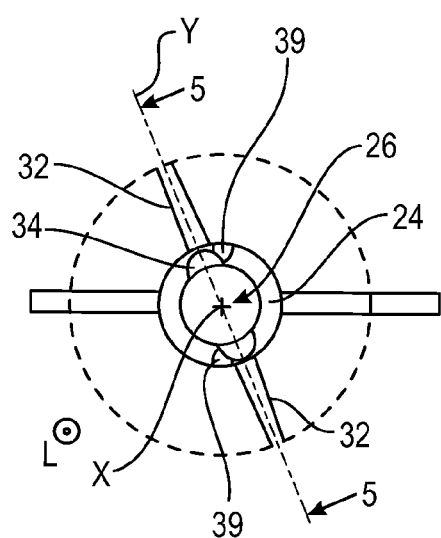
FIG. 10 is a front view showing a traction propulsion unit of the aircraft of FIG. 1 in which the blades of the propeller are deployed in a pitch angular position allowing a lifting thrust, with the propeller occupying any angular position about its axis of rotation.

According to a first embodiment of the folding device 50 shown in FIGS. 8 and 9, the control member 56 of each transmission 54 is formed by a slider which is mounted so as to slide radially along the pitch axis "Y" in the associated blade cuff 38 between an extreme internal position corresponding to one of the positions of the associated blade 32 and an extreme external position corresponding to the other of the positions of the associated blade 32.

The external extreme position of the control member 56, shown in FIG. 8, corresponds here to the deployed position of the associated blade 32, while its internal extreme position, shown in FIG. 9, corresponds to the folded position of the associated blade 32.

The sliding of the movable control member 56 is here actuated by means of a cam 60 which cooperates with the movable control member 56 by means of a cam follower 62. The cam follower 62 is mounted in a slidingly fixed manner along the pitch axis "Y" to the control member 56.

More particularly, the cam 60 is mounted to slide longitudinally along the axis "X" of rotation between a first forward longitudinal position, which corresponds here to the deployed position of the blade 32 shown in FIG. 8, and a second rear longitudinal position, which corresponds here to the folded position of the blade 32 shown in FIG. 9. To this end, the cam 60 has a sloping profile extending from a front end, arranged radially close to the axis "X" of rotation, to a rear end, arranged at a greater radial distance from the axis "X" of rotation.

The cam 60 is mounted in a slidingly fixed manner to a sliding rod 64 of the folding actuator 52. As the blades 32 are all controlled simultaneously by the same folding actuator 52, all the cams 60 of each of the transmissions 54 are here attached to the same sliding rod 64. The sliding rod 64 is coaxial with the axis "X" of rotation.

The folding actuator 52 is here mounted in a rotationally fixed manner to the propeller 26 about the axis "X" of rotation.

Alternatively, the folding actuator is mounted stationary with respect to the nacelle. In this case, the cam may be formed by a frustum of a cone which allows it to co-operate with the cam follower regardless of the angular position of the propeller about the axis of rotation, or the cam may be rotatably mounted about the axis of rotation with respect to the nacelle to accompany the propeller in its rotation and remain in coincidence with the cam follower of the associated blade.

Furthermore, the cam follower 62 is formed here by a roller rotating about an axis orthogonal to the axis "X" of rotation and orthogonal to the axis "Y" of pitch. This is, for example, a diabolo-shaped roller with two parallel rolling surfaces on the cam 60. Advantageously, the cam follower 62 is guided laterally with respect to the cam 60 as it slides by means of longitudinal rails 66 which are carried by the cam 60. In order for the cam follower 62 to remain engaged in the rails 66 regardless of the pitch angular position "β" of the associated blade 32, it is mounted rotating about the pitch axis "Y" on the movable control member 56. The cam follower 62 is thus carried by a clevis 70 which is pivotally mounted, for example by means of a rolling bearing, on an internal end of the movable control member 56. Thus, the axis of rotation of the cam follower 62 remains orthogonal to the axis "X" of rotation whatever the pitch angular position "β" of the associated blade 32, while the movable control member 56 is free to pivot securely with the blade cuff 28 about the pitch axis "Y".

Figure 5:
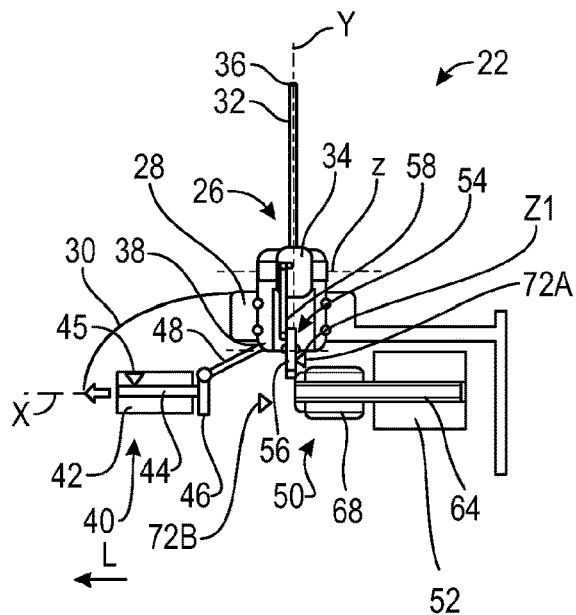
FIG. 5 is an axial cross-sectional view according to the sectional plane 5-5 of FIG. 10 which represents the rotating portion of a traction propulsion unit in which the blades of the propeller are deployed in a pitch angular position allowing a lifting thrust, the traction propulsion unit being equipped with a folding device made according to a first embodiment of the disclosure.
Figure 6:
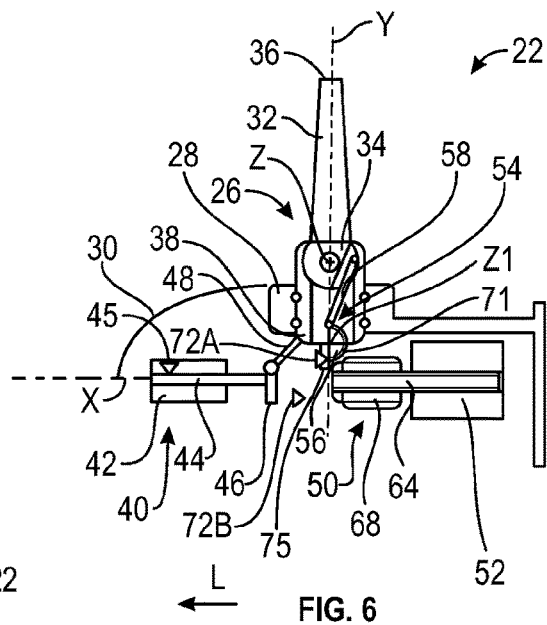
FIG. 6 is an axial cross-sectional view according to the sectional plane 6-6 of FIG. 12 which shows the rotating portion of a traction propulsion unit in which the blades of the propeller are deployed in a folding pitch angular position, the traction propulsion unit being equipped with the folding device made according to the first embodiment.
Figure 7:
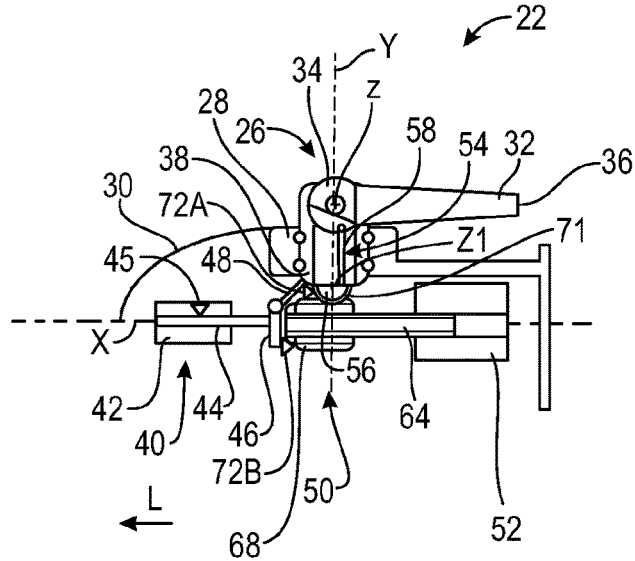
FIG. 7 is an axial cross-sectional view according to the sectional plane 7-7 of FIG. 13 which shows the rotating portion of a traction propulsion unit in which the blades of the propeller are folded, the traction propulsion unit being equipped with the folding device made according to the first embodiment.

According to a second embodiment of the folding device 50 shown in FIGS. 5 to 7, the movable control member 56 is formed by a crank which is pivotally mounted in the blade cuff 38 about a control axis "Z1" parallel to the folding axis "Z" between a first extreme angular position corresponding to one of the positions of the associated blade 32 and a second extreme angular position corresponding to the other of the positions of the associated blade 32. The second end of the link 58 is pivotally mounted on the control member 56 eccentrically with respect to its control axis "Z1".

The pivoting of the movable control member 56 is here actuated by means of a rack 68 which meshes with a toothed sector 71 of the movable control member 56. More particularly, the rack 68 is mounted to slide longitudinally along the axis "X" of rotation between a first rear longitudinal position, which here corresponds to the deployed position of the blade 32, as shown in FIGS. 5 and 6, and a second front longitudinal position, which here corresponds to the folded position of the blade 32, as shown in FIG. 7. The rack 68 extends parallel to the axis "X" of rotation.

The rack 68 is mounted in a slidingly fixed manner to the sliding rod 64 of the folding actuator 52. As the blades 32 are all controlled simultaneously by the same folding actuator 52, all the racks 68 of each of the transmissions 54 are here attached to the same sliding rod 64. The sliding rod 64 is coaxial with the axis "X" of rotation. The folding actuator 52 is here mounted in a rotationally fixed manner to the propeller 26 about the axis "X" of rotation.

Regardless of the embodiment of the folding device 50, it is advantageous to be able to check whether the blades 32 of the propeller 26 are in their deployed position or their folded position. Thus, the folding device 50 is here equipped with a device for detecting the position of the blade 32. The detection device is for example formed by a first deployment sensor 72A and a second folding sensor 72B. The first deployment sensor 72A is arranged so as to detect that a movable element arranged on the transmission chain between the folding actuator 52 and the blade 32 occupies a specific position corresponding to the deployed position of the blade 32, while the second folding sensor 72B is arranged so as to detect that a movable element arranged on the transmission chain between the folding actuator 52 and the blade 32 occupies a specific position corresponding to the folded position of the blade 32. Here, the sensors 72A, 72B operate in an on/off manner, with the sensors 72A, 72B being activated only when the blade 32 occupies the associated deployed or folded position. These are, for example, contact sensors 72A, 72B or inductive sensors 72A, 72B.

In the examples shown in FIGS. 8 and 9 corresponding to the first embodiment of the folding device 50, the deployment sensor 72A is activated by the free end of the control rod 64, while the folding sensor 72B is activated by a rear end of the cam 60.

In the examples shown in FIGS. 5 to 7 corresponding to the second embodiment of the folding device 50, the deployment sensor 72A is activated by the control member 56 in its angular position corresponding to the deployed position of the blade 32, while the folding sensor 72B is activated by a front end of the control rod 64.

In addition, a mechanical locking device may be provided for the blade 32 in its deployed position and its folded position. The locking device is formed, for example, by a latch 75 which cooperates with a movable element arranged on the transmission chain between the folding actuator 52 and the blade 32. The latch 75 is here arranged so as to block the pivoting of the movable control member 56 when the blade 32 is in its deployed position and its folded position. The latch 75 is here actuated by the sliding of the rack 68.

Figure 14:
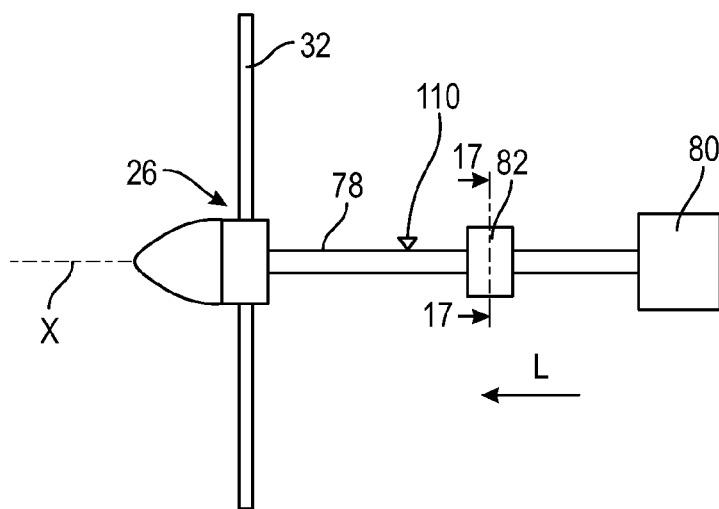
FIG. 14 is a profile view showing schematically a rotating portion of a propulsion unit of the aircraft of FIG. 1 in a first configuration in which the propeller is driven by an electric motor separate from a stepper motor.
Figure 15:
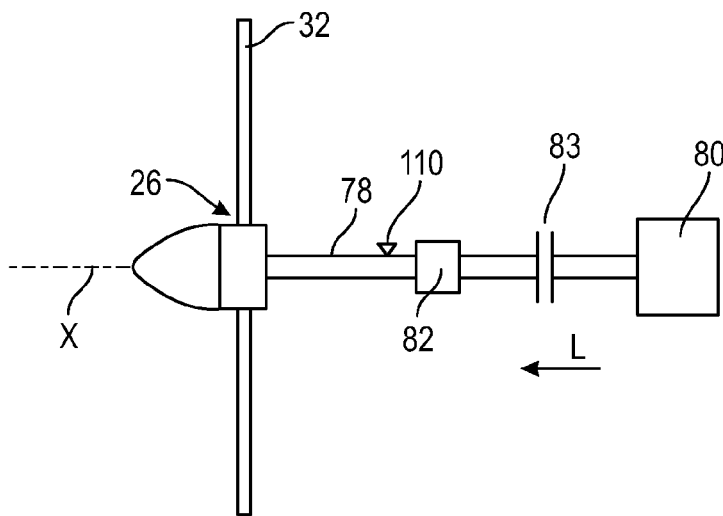
FIG. 15 is a similar view to FIG. 14 in which the propulsion unit is made in a second configuration in which the propeller is driven by a combustion engine separate from a stepper motor.
Figure 16:
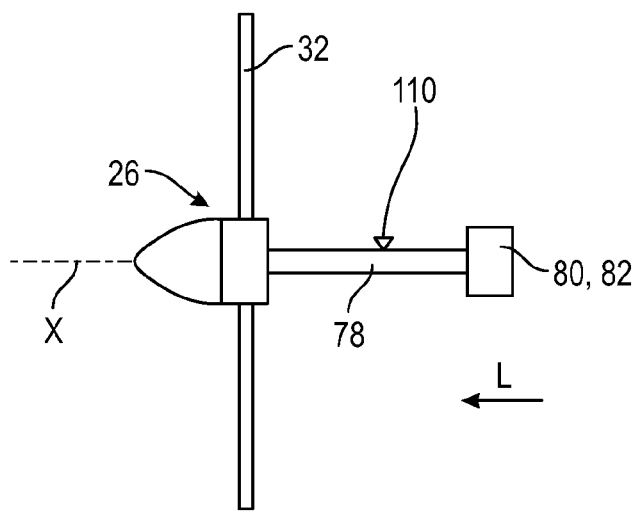
FIG. 16 is a similar view to FIG. 14 in which the propulsion unit is made in a third configuration in which the propeller is driven by a stepper motor.

In another aspect of the propulsion unit 22, it comprises a rotor shaft 78 which is rotatably mounted in the nacelle 24 coaxially with the axis "X" of rotation and which is mounted in a rotationally fixed manner to the propeller 26, as shown in FIGS. 14 to 16. The propulsion unit 22 further comprises propulsion means which drives the propeller 26 in rotation by means of the rotor shaft 78.

The propulsion unit 22 further comprises indexing means for stopping the propeller 26 in at least one indexed angular position "θi" about the axis "X" of rotation in which the blades 32 in the deployed position are in coincidence with the housings 34 of the nacelle 24. Due to the rotational invariance of the propeller 26, the latter is likely to have as many indexed angular positions "θi" as there are blades 32.

The indexing means are formed by an electric stepper motor 82. In a known way such a stepper motor 82 comprises a rotor 84 which is rotatably mounted in a stator 86. The rotor 84 is coupled to the hub 28 of the propeller 26 while the stator 86 is stationary with respect to the nacelle 24. The rotor 84 is here mounted in a rotationally fixed manner to the rotor shaft 78 about the axis "X" of rotation.

Such a stepper motor 82 has the advantage of being able to slow down the propeller 26 by opposing its rotation with a resistive torque. In addition, it also allows to provide the propeller 26 with a motor torque allowing to bring it with a great precision to one of its indexed angular positions "θi". Finally, the stator 86 of the stepper motor 82 is arranged so as to match each of the indexed angular positions "θi" of the propeller 26 with a pitch of the stepper motor 82 allowing to lock the propeller 26 against rotation in each of its indexed angular positions "θi".

In the example shown in FIG. 14, the propulsion means comprise an electric propulsion motor 80 which is separate from the stepper motor 82. In this case, the stepper motor 82 is interposed between the propulsion motor 80 and the propeller hub 28 on the transmission chain of the motor torque produced by the propulsion motor 80. The stepper motor 82 is here arranged directly on the rotor shaft 78 which is permanently coupled to a motor shaft of the propulsion motor 80.

In the example shown in FIG. 15, the propulsion motor 80 is a combustion engine. In this case, the stepper motor 82 is interposed between the propulsion motor 80 and the propeller hub 28 on the transmission chain of the motor torque produced by the propulsion motor 80. The stepper motor 82 is here arranged directly on the rotor shaft 78 which is coupled in a controlled manner to a motor shaft of the propulsion motor 80 by means of a clutch 83.

In the example shown in FIG. 16, the electric stepper motor 82 forms the propulsion means.

Figure 17:
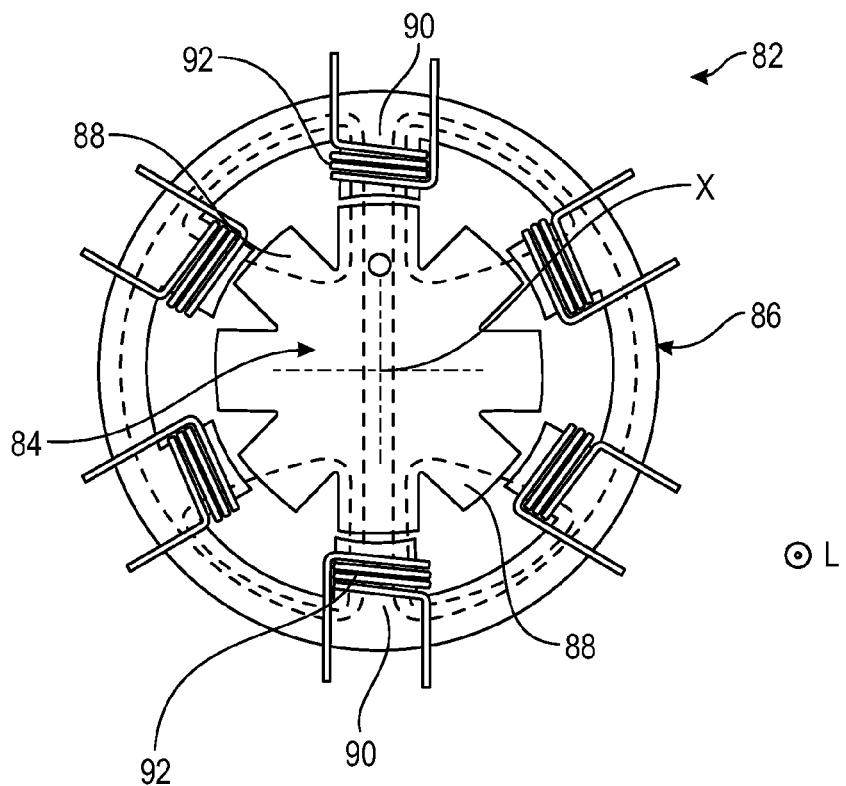
FIG. 17 is a radial cross-sectional view according to the cross-sectional plane 17-17 of FIG. 14 which shows the stepper motor according to a first embodiment.
Figure 18:
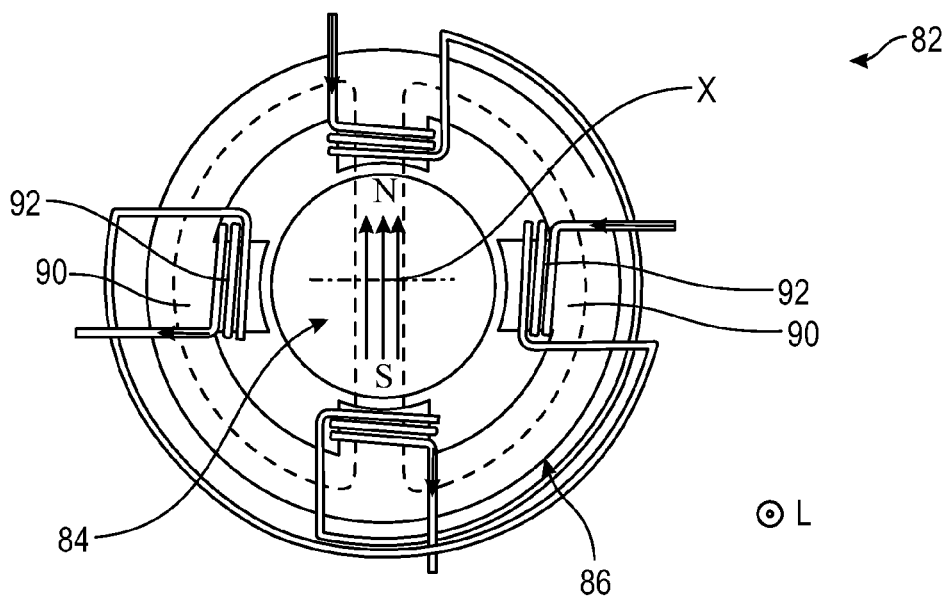
FIG. 18 is a similar view to FIG. 17 which shows the stepper motor in a second embodiment.

In a first embodiment of the indexing means, shown in FIG. 17, the electric stepper motor 82 is a variable reluctance motor, also referred to as "variable reluctance stepper" or "Switched Reluctance Motor" (SRM). In such a stepper motor 82, the rotor 84 is made of a ferromagnetic material. The rotor 84 is for example formed by a stacking of soft iron sheet-metal or the rotor 84 is produced of a monolithic part of magnetic steel. The rotor 84 comprise an external toothing with an even number of teeth 88.

The stator 86 is generally produced of a stacking of ferromagnetic sheet-metal. The stator 86 comprises an internal toothing comprising an even number of teeth 90. It comprises several electric coils 92. The coils 92 arranged around two opposing teeth 90 are powered in series to form two electromagnets whose poles of opposite sign are directed radially towards the rotor 84.

The number of teeth of the rotor 84 and the number of coils of the stator 86 are different and allow the number of pitch of the stepper motor 82 to be determined, i.e. the number of angular positions in which the rotor 84 can be stably stopped by powering two opposing electric coils 92 of the rotor 86.

By powering the opposing pairs of electric coils 92 in turn, it is thus possible to rotate the rotor 84 by attracting the rotor teeth 88 nearest to the alignment of the electric coils 92.

In a second embodiment of the indexing means, the electric stepper motor 82 is a permanent magnet motor, also referred to as "permanent magnet stepper".

The stator 86 is here substantially identical to that of a variable reluctance stepper motor as described in the first embodiment. Instead of teeth, however, the rotor 84 comprises at least one permanent magnet comprising a north pole "N" and a south pole "S", the polar axis of which is oriented radially. The poles "N", "S" of the permanent magnets are arranged symmetrically with respect to the axis of rotation "X" in such a way that the north poles "N" and the south poles "S" are arranged alternately around the axis of rotation "X".

Such a stepper motor 82 generally has a higher torque than a variable reluctance motor.

Figure 19:
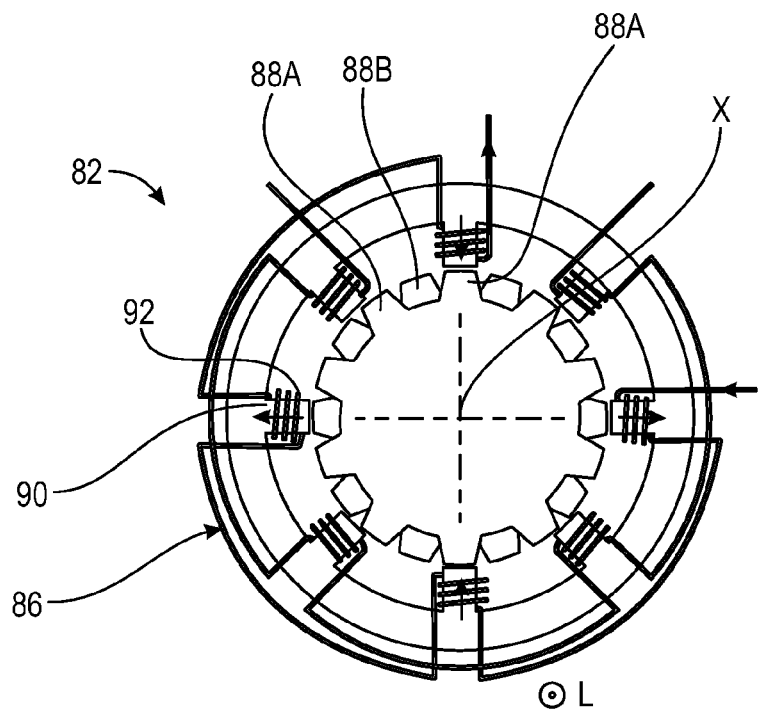
FIG. 19 is a similar view to FIG. 17 which shows the stepper motor in a third embodiment.
Figure 20:
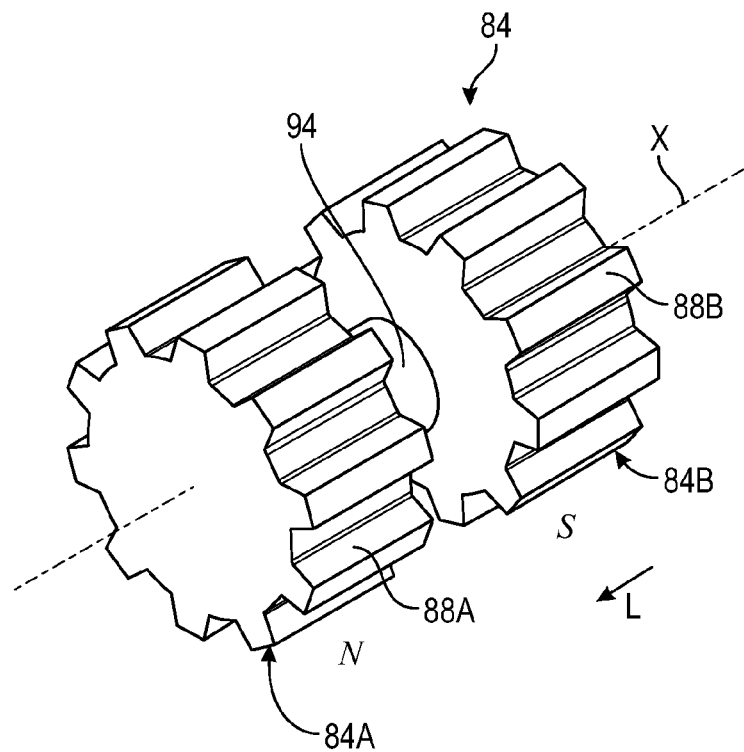
FIG. 20 is a perspective view showing a rotor of the stepper motor in FIG. 19.

In a third embodiment of the indexing means shown in FIGS. 19 and 20, the electric stepper motor 82 is a hybrid motor, also known as "hybrid synchronous stepper".

The stator 86 is here substantially identical to that of a variable reluctance stepper motor as described in the first embodiment.

On the other hand, the rotor 84 is here formed by two toothed wheels 84A, 84B made of ferromagnetic material having an external toothing equipped with a same even number of teeth 88A, 88B. The two toothed wheels 84A, 84B are mounted coaxially with an axially interposed permanent magnet 94 with a north pole in contact with one toothed wheel 84A, while the south pole is in contact with the other toothed wheel 84B.

Due to this configuration, the teeth 88A of the first toothed wheel 84A form north poles, while the teeth 88B of the second toothed wheel 88B form south poles. The teeth 88A of the first toothed wheel 84A are angularly offset from the teeth 88B of the second toothed wheel 84B. Thus, in axial view, the teeth 88A forming north poles are angularly interposed between two teeth 88B forming south poles.

The rotor 84 thus formed is rotatably received within the stator 86. Thus, powering some of the coils 92 of the stator 86 will attract the teeth 88A, 88B closest to the rotor 84 of opposite sign.

Such a hybrid stepper motor 82 has the advantage of having a large number of steps, like the variable reluctance motor 82 described in the first embodiment, while having a high motor torque, like the permanent magnet motor 82 described in the second embodiment.

Figure 21:
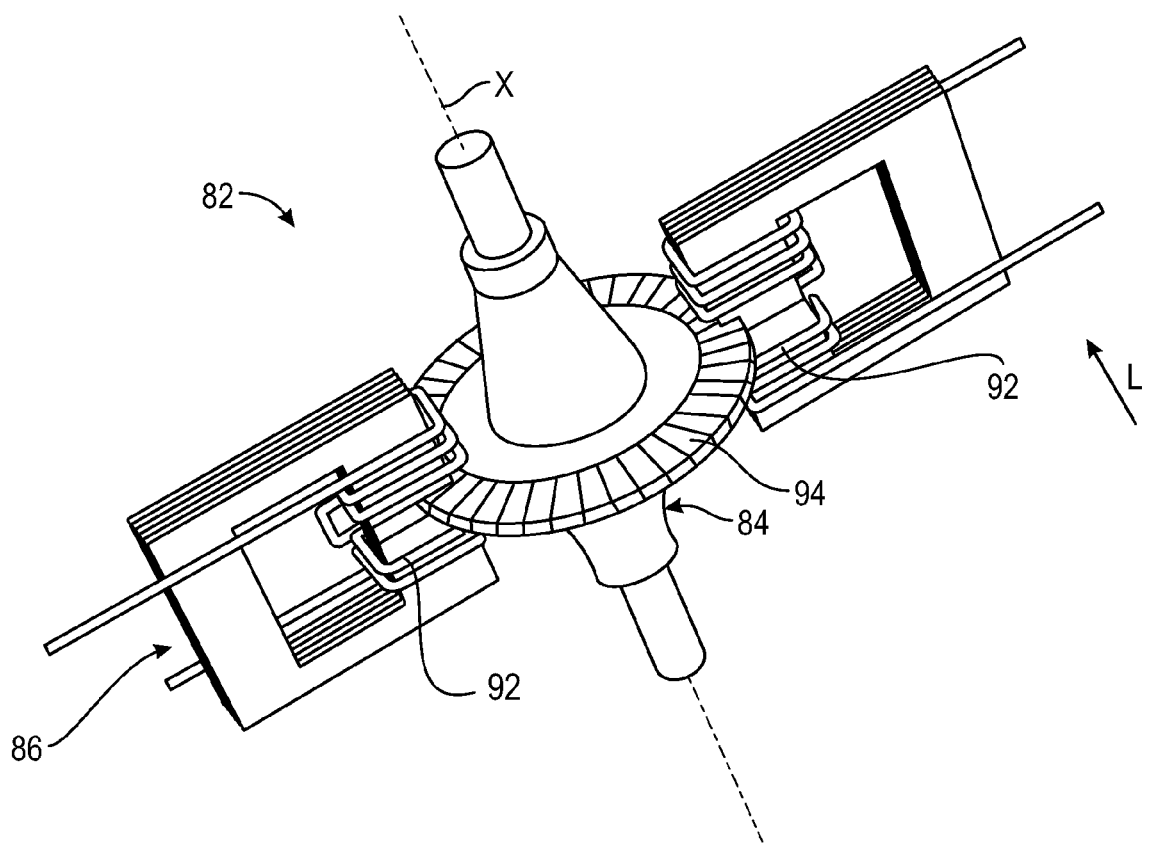
FIG. 21 is a perspective view showing the stepper motor in a fourth embodiment.

Alternatively to this third embodiment, as shown in FIG. 21, this is an axial flow stepper motor 82 in which the rotor 84 is formed by a disc equipped at its periphery with magnets 94 having poles of alternating signs. The stator 86 also comprises electromagnets formed by electrical coils 92 wound around cores of ferromagnetic material so as to produce a magnetic field directed parallel to the axis "X" of rotation of the rotor 84 in the direction of the periphery of the rotor 84.

Regardless of the type of stepper motor 82 implemented, the propulsion unit 22 advantageously comprises a device 96 for mechanically locking the propeller 26 about its axis "X" of rotation relative to the nacelle 24 in each of its indexed angular positions "θi". Furthermore, the locking device 96 is designed so that the propeller 26 can only be locked in the indexed angular positions "θi".

Figure 22:
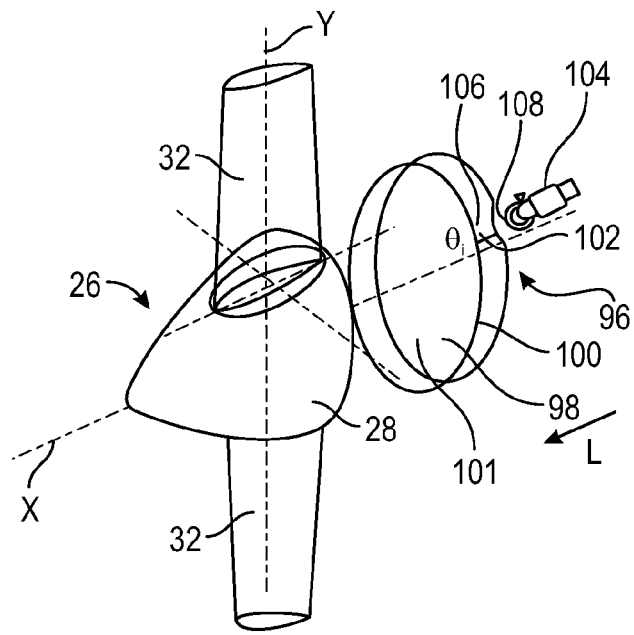
FIG. 22 is a perspective view showing schematically a propeller of a propulsion unit of FIG. 1 comprising a device for locking the propeller for rotation relative to the nacelle, the locking device being in an inactive state.
Figure 23:
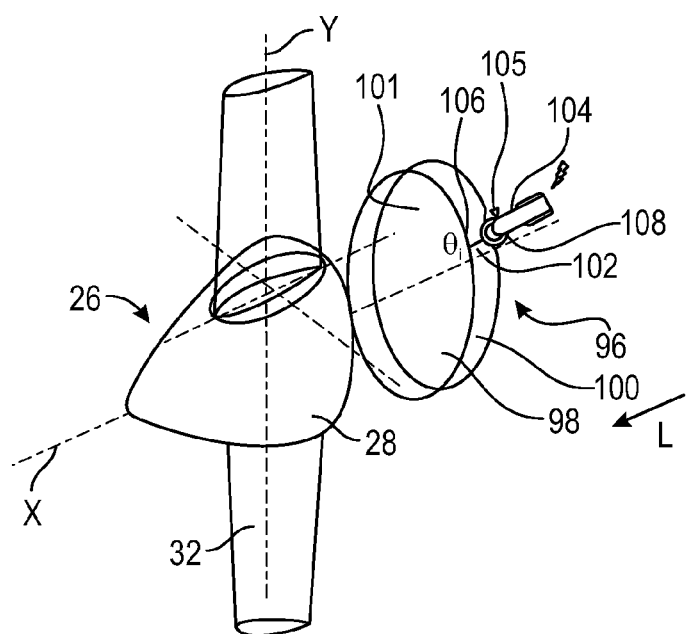
FIG. 23 is a similar view to FIG. 22 in which the locking device is in an active state.

As shown in FIGS. 22 and 23, the locking device 96 here comprises a disc 98 which is mounted in a rotationally fixed manner to the propeller 26. The disc 98 is mounted coaxially with the axis "X" of rotation. The disc 98 is radially delimited by an annular peripheral edge 100 and axially delimited by two circular faces 101. The disc 98 comprises at least one detent 102 which corresponds to one of the indexed angular positions "θi". Here the disc 98 comprises a single detent 102.

Alternatively, the disc 98 may comprise a plurality of detents 102 each corresponding with an indexed angular position "θi". The disc 98 may thus comprise a number of detents 102 that is equal to the number of indexed angular positions "θi". In particular, this allows an indexed angular position "θi" to be reached more quickly without having to make a full propeller turn again.

The detents 102 are configured to cooperate with a locking member 104 which is mounted so as to be movable with respect to the nacelle 24 between an inactive position in which the disc 98 is free to rotate and an active position in which the locking member 98 is configured to receive in a detent 102 when the propeller 26 occupies one of its indexed angular positions "θi" to immobilize the propeller 26 in rotation with respect to the nacelle 24 about the axis "X" of rotation. The locking member 104 is for example moved by an electric actuator.

In the embodiment shown in FIGS. 22 and 23, the detents 102 are produced in the peripheral edge 100 of the disc 98. The locking member 104 is here mounted to slide radially with respect to the nacelle 24 between its inactive position in which it is spaced from the peripheral edge 100, as shown in FIG. 22, and its active position in which it is displaced radially towards the axis "X" of rotation to enter a detent 102 in coincidence, as shown in FIG. 23. When the propeller 26 does not occupy one of its indexed angular positions "θi", the locking member 104 cannot be controlled into its active position, as it would abut the peripheral edge 100 of the disc 98.

In a variant of the disclosure not shown, the detents are produced on an annular track on one of the circular faces of the disc. In this case, the locking member can be mounted to slide in a longitudinal direction with respect to the nacelle.

A locking sensor 105, for example a contact sensor or an inductive sensor, allows to detect when the locking member 104 is in its active position.

Advantageously, each detent 102 has a cam track shape equipped with two ramps that converge towards a bottom 106. The bottom 106 is arranged such that when the locking member 104 is received in the bottom of the detent 102, the propeller 26 then occupies exactly one of its indexed angular positions "θi". The locking member 104 comprises a roller 108 or a sliding coating at its free end, which can roll or slide against the ramps of the detent 102. Thus, when the propeller 26 is stopped in an angular position that is arranged within a tolerance range [θi−λ; θi+λ] determined on either side of one of its indexed angular positions "θi", the roller 108 comes into contact with one of the ramps of the detent 102 when the locking member 104 is controlled towards its active position. The locking member 104 provides a sufficient force to rotate the propeller 26 by cooperation with the ramp of the detent 102 as it displace towards its active position until the roller 108 is at the bottom 106 of the detent 102 to accurately position the propeller 26 in its indexed angular position "θi". In order to carry out such an operation, it is preferable that the propeller 26 is not subjected to any motor or resisting torque other than those due to friction of the rotational guide members of the propeller 26. Furthermore, to ensure that the propeller 26 occupies its overall indexed angular position "θi", or at least occupies an angular position within the tolerance range [θi−λ; θi+λ] determined on either side of one of its indexed angular positions "θi", the propulsion unit 22 comprises a sensor 110 for the angular position of the propeller 26 relative to the nacelle 24, as shown in FIGS. 14 to 16.

For example, an inductive sensor 110 allows to measure the angular position of the propeller without contact. A first rotor element 111 is thus mounted in a rotationally fixed manner to the propeller 26, while a second stator element 113 allows the angular position of the rotor element to be detected by electromagnetic means.

Figure 24:
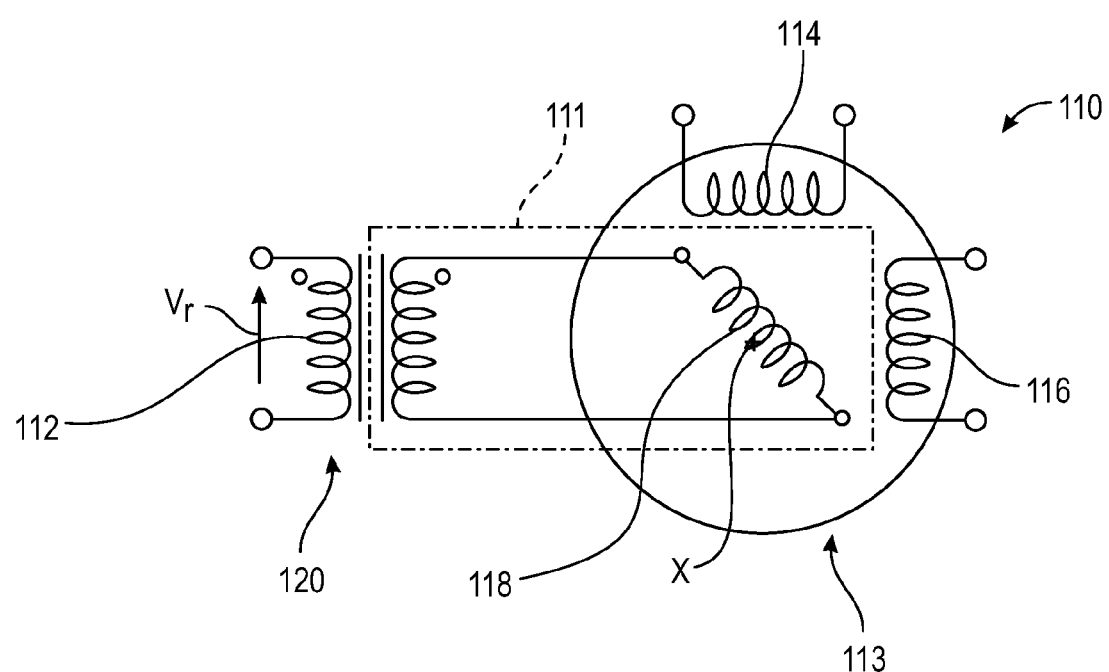
FIG. 24 is an electrical diagram showing a sensor for the angular position of the propeller about its axis of rotation relative to the nacelle.

As shown in FIG. 24, the inductive sensor 110 is here a resolver, also known as "RVDT" or "Rotary Variable Differential Transformer". As a known non-limiting example, such a sensor 110 comprises a primary coiling 112 and two secondary coilings 114, 116 which are carried by the stator element 113. The primary coiling 112 is powered with an alternating voltage "Vr". The two secondary coilings 114, 116 are offset by 90° about the axis "X" of rotation. The rotor element 111 comprises a reference coiling 118. The reference coiling 118 and the primary coiling 112 form a rotary transformer 120. The secondary coilings 114, 116 are energized by the rotation of the reference coiling 118 carried by the rotor element 111. The value of the voltage in each of the secondary coilings 114, 116 uniquely allows to determine the angular position of the rotor element 111 about the axis "X" of rotation.

Alternatively, the inductive sensor 110 is formed by a product known under the trade name INDUCTOSYN, which allows a high angular precision to be achieved.

Figure 25:
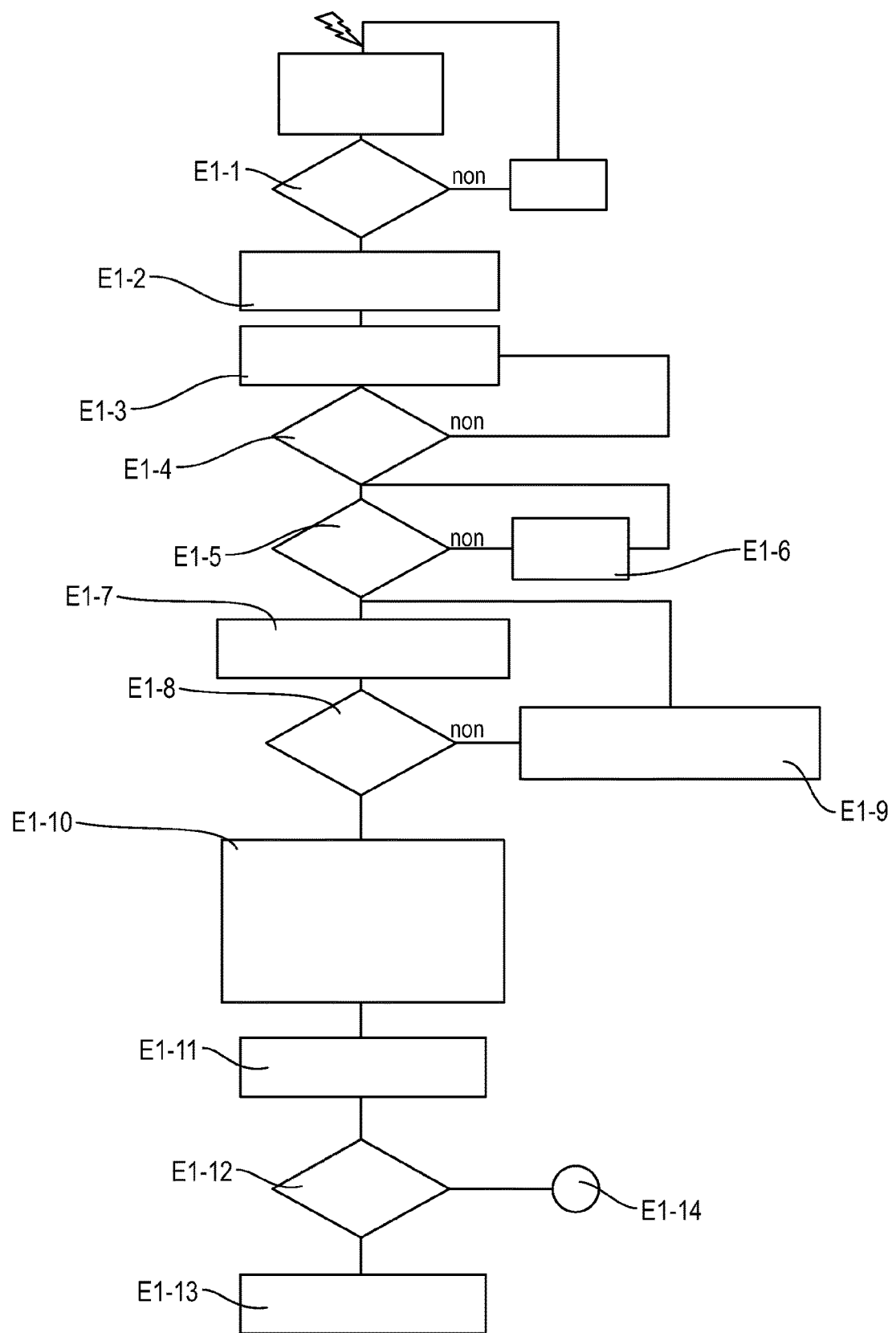
FIG. 25 is a block diagram showing the various steps in a method for folding the blades of a propulsion unit of the aircraft of FIG. 1.

A method for folding the blades 32 of the propeller 26 of the propulsion unit 22 is now described with reference to FIG. 25. Such a method is implemented by an electronic control unit not shown. The method can be triggered either automatically or by manual command from the pilot. At the start of the method, the blades 32 of the propeller 26 are deployed as shown in FIGS. 2, 3, 5, 6 and 8. The blades 32 occupy a pitch angular position "β" which may be different from its folding pitch angular position "β0", as shown in FIGS. 2 and 5. In addition, the propeller 26 is generally driven in rotation by the propulsion means.

In a first step "E1-1", certain flight conditions of the aircraft are checked in order to obtain the authorization to continue the folding method of the blades 32.

For example, when the step "E1-1" is applied to a lift propulsion unit 22, it is checked that the aircraft 20 has reached a sufficient speed for its wing to provide the bearing capacity without the need for lifting thrust from the lift propulsion units 22. For example, it is checked that the forward speed "V" of the aircraft 20 is well above a first determined threshold speed "V0". If this is the case, a step "E1-2" of stopping the next propulsion is triggered, otherwise the folding method is interrupted.

According to another example, when the step "E1-1" is applied to a traction propulsion unit 22, it is checked that the aircraft 20 has reached a speed sufficient for economical cruise flight not requiring all traction propulsion units 22 to be used simultaneously to provide thrust force to the aircraft 20. For example, it is checked that the forward speed "V" of the aircraft 20 is well above a second determined threshold speed "V1". The blades 32 of the traction propulsion units 22 can also be folded when the aircraft 20 is in hovering flight as they are no longer required. It is then checked that the forward speed of the aircraft 20 is zero. If one of these conditions is checked, the next step "E1-2" is triggered, otherwise the folding method is interrupted.

In the stopping step "E1-2" of the propulsion, the driving torque provided by the propulsion means is interrupted so that the propeller 26 rotates freely only due to its inertia.

When the propeller 26 is driven by a combustion propulsion motor 80, the clutch 83 is controlled to a disengaged position, either at the start of the step "E1-2" of stopping the propulsion, or after a set period of time determined for the friction of the motor to have begun to slow the propeller 26.

When the propeller 26 is driven by an electric propulsion motor 80, the propulsion motor 80 remains coupled to the propeller 26 as the friction in such a motor is generally low.

At the end of the step "E1-2" of stopping the propulsion, a pitch step "E1-3" is triggered. In this pitch step "E1-3", the blades 32 of the propeller 26 are controlled to their folding pitch angular position "β0", i.e. to a feathered position for a traction propulsion unit 22, as shown in FIGS. 6, 8 and 11, or to a zero bearing capacity position for a lift propulsion unit 22, as shown in FIG. 3.

The pitch step "E1-3" is followed by a step "E1-4" of checking the pitch angular position during which it is checked, by means of the pitch sensor 45, that the blades 32 occupy their folding pitch angular position "β0". A slight offset "E" of a few degrees from the folding pitch angular position "β0" in either orientation is usually tolerated. In this way, it is more precisely checked that the pitch angular position "β" of the blades 32 is comprised in a pitch angular position range delimited by a lower threshold of "β0−∈" and by an upper limit of "β0+∈". If this is the case, a method for stopping the rotation of the propeller 26 in one of its indexed angular positions "θi" is triggered, otherwise, the step "E1-3" is repeated.

The method for stopping the rotation of the propeller 26 in one of its indexed angular positions "θi" comprises a step "E1-5" of checking the speed "Nr" of rotation, during which it is checked that the speed "Nr" of rotation of the propeller 26 is less than or equal to a determined speed "Nre" of rotation.

If the rotational speed "Nr" of the propeller 26 is higher than a certain rotational speed "Nre" a braking step "E1-6" is triggered. During the braking step "E1-6", the stepper motor 82 is controlled to produce a resistive torque which opposes free rotation of the propeller 26 until the rotational speed "Nr" of the propeller 26 is less than or equal to a predetermined rotational speed "Nre". The rotational speed of "Nr" of the propeller 26 is measured by sensors (not shown) which are already well known and will not be described in more detail later. At the end of this braking step "E1-6", the step "E1-5" of checking the rotational speed "Nr" is repeated.

If the rotational speed "Nr" of the propeller 26 is less than or equal to the determined rotational speed "Nre", a step "E1-7" of blocking the propeller in an indexed angular position is triggered. In this step, the stepper motor 82 is controlled to block the propeller 26 in the indexed angular position "θi" using the stepper motor 82.

The blocking step "E1-7" is followed by a step "E1-8" of checking the angular position "θ" of the propeller 26, here by means of the inductive sensor 110. If the measured angular position "θ" of the propeller 26 is within the tolerance interval [θi−λ; θi+λ] determined on either side of the indexed angular position "θi", a locking step "E1-10" is triggered, otherwise an adjusting step "E1-9" is triggered.

The adjusting step "E1-9" consist of controlling the stepper motor 82 to provide a rotational torque that drives the propeller 26 in rotation about its axis "X" of rotation towards one of the indexed angular positions "θi".

During this adjusting step "E1-9", the propeller 26 is driven in rotation in one orientation only. Thus, when the propeller 26 passes an indexed angular position "θi", the stepper motor 82 drives the propeller 26 in rotation to its next indexed angular position "θi".

Alternatively, the propeller 26 may be driven in rotation in both orientations by the stepper motor 82 so that the propeller 26 rotates towards the nearest indexed angular position "θi".

After this adjusting step "E1-9", the blocking step "E1-7" is repeated.

The steps of adjusting "E1-9", blocking "E1-7" and checking "E1-8" are repeated until the angular position "θ" of the propeller 26 is within the tolerance interval [θi−λ; θi+λ] determined on either side of one of the indexed angular positions "θi".

In the locking step "E1-10", the propeller 26 is rotationally locked with respect to the nacelle 24 in its indexed angular position "θi" by means of the mechanical locking device 96, as shown in FIG. 23. As, previously explained, the locking device 96 allows the propeller 26 to be brought precisely into its indexed angular position "θi" through the cooperation between the locking member 104, controlled towards its active position, with the ramps of the detent 102.

At the end of the locking step "E1-10", a step "E1-11" of folding the blades 32 is triggered. In this step, the blades 32 are folded into their respective housings 39 by means of the folding device 50, as previously described and as shown in FIGS. 4, 7, 9 and 13.

Then, in a step "E1-12" of checking the folding, it is checked that the blades 32 are properly folded by means of the sensor 72B. If the blades 32 are in the folded position, the latch 75 is controlled to lock the blades 32 in the folded position in a final locking step "E1-13", otherwise an incident is reported to the pilot of the aircraft 20, as shown at reference "E1-14" in FIG. 25.

The aerodynamic design of the blades will take into account the requirement of not deploying the folded blades unintentionally, especially in the absence of an effective locking of the blades in the folded position, under certain flight conditions to be respected in this failure case.

Figure 26:
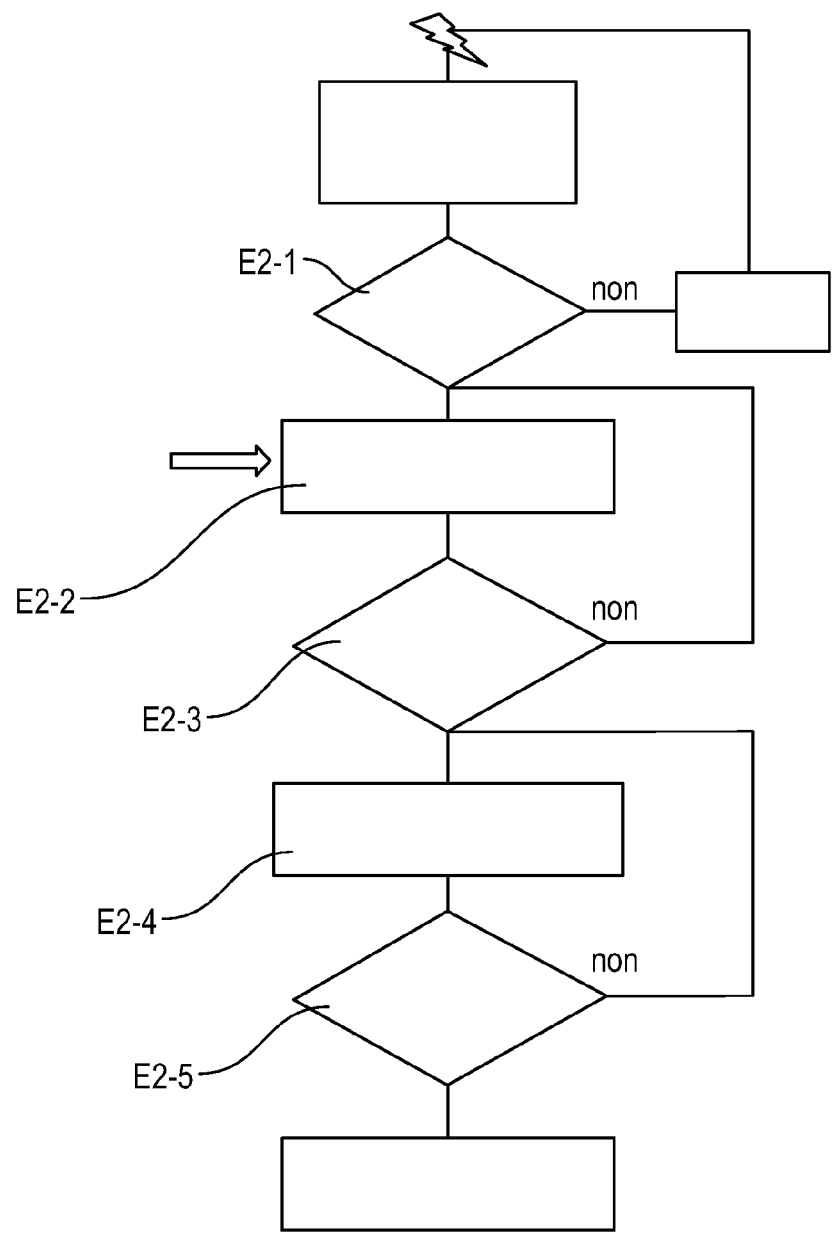
FIG. 26 is a block diagram showing the various steps in a method for deploying the blades of a propulsion unit of the aircraft of FIG. 1.

A method for deploying the blades 32 of a propulsion unit 22 is now described with reference to FIG. 26. Such a method is implemented by an electronic control unit not shown. The method can be triggered either automatically or by manual command from the pilot.

In a first step "E2-1", certain flight conditions of the aircraft 20 are checked that must be met in order to obtain authorization to continue the deployment method of the blades 32.

For example, when the step "E2-1" is applied to a lift propulsion unit 22, it is checked that the speed of the aircraft 20 is decreasing and approaching a speed at which its wing will no longer be sufficient to provide bearing capacity force without lifting thrust from the lifting propulsion units 22. It is checked, for example, that the forward speed "V" of the aircraft 20 decreases to a determined third threshold speed "V2". If this is the case, a subsequent deployment step "E2-2" is triggered, otherwise the deployment method is not allowed.

According to another example, when the step "E2-1" is applied to a traction propulsion unit 22, it is checked that the speed of the aircraft 20 is below a sufficient economic cruising speed requiring all traction propulsion units 22 to be used simultaneously to provide a thrust force to the aircraft 20. For example, it is checked that the forward speed "V" of the aircraft 20 is well below a fourth determined threshold speed "V3". The blades 32 of the traction propulsion units 22 may also be deployed when the aircraft 20 is about to leave a hovering flight. If one of these conditions is checked, the next step "E2-2" is triggered, otherwise the deployment method is interrupted.

In the deployment step "E2-2", the latch 75 is retracted and the folding actuator 50 is operated to deploy the blades 32.

In a subsequent checking step "E2-3" of the deployment, the deployment sensor 72A is used to check that the blades 32 are in their deployed position. If this is the case, a step "E2-4" of unlocking the propeller 26 is triggered, otherwise, the step "E2-2" of deployment is repeated.

In the unlocking step "E2-4", the locking member 104 of the mechanical locking device 96 of the propeller 26 is controlled to its inactive position to release the rotation of the propeller 26.

In a step "E2-5" of checking the unlocking, it is checked that the propeller 26 is unlocked in rotation by means of the locking sensor 105. If so, the deployment method is completed and the propulsion unit 22 is ready for use, otherwise the unlocking step "E2-4" is repeated.

The invention claimed is:

1. A propulsion unit having a propeller for an aircraft, comprising:
   a nacelle configured to be attached to a structural element of the aircraft;
   the propeller, the propeller being rotatably mounted in the nacelle about a longitudinal axis of rotation (X) by a hub, the propeller comprising blades each of which is mounted to and pivotally fixed relative to an associated blade cuff which is pivotally mounted about a radial pitch axis (Y) with respect to the hub, and each blade being pivotally mounted with respect to the blade cuff about a folding axis (Z) orthogonal to the radial pitch axis (Y); and
   a folding device which comprises a folding actuator controlling the pivoting of each blade relative to the associated blade cuff between a deployed position, in which the blades extend radially with respect to the axis (X) of rotation, and a folded position, in which the blades extend longitudinally against the nacelle,
   the folding device comprising a plurality of transmissions, each transmission being coupled to an associated one of the blades and comprising:
   a movable control member mounted to and fixed in rotation relative to the associated blade cuff and which is moved by the folding actuator, and
   a link comprising a first end pivotally mounted on a root of the associated one of the blades eccentrically with respect to the folding axis (Z) and a second end pivotally mounted on the movable control member,
   wherein the movable control member is formed by a crank which is pivotally mounted in the associated blade cuff around of a control axis (Z1) parallel to the folding axis (Z), and the pivoting of the movable control member is actuated by means of a gearing between a toothed sector of the crank and a rack which is mounted to slide longitudinally and driven by the folding actuator.

2. The propulsion unit according to claim 1, wherein all the racks of each of the transmissions are attached to a common rod of the folding actuator which is slidable along the axis (X) of rotation between a first position corresponding to the deployed position of the blades and a second position corresponding to the folded position of the blades.

3. The propulsion unit according to claim 2, further comprising a device configured to detect a position of the actuator rod in the first position and the second position.

4. The propulsion unit according to claim 1, further comprising a device configured to mechanically lock the movable member in each of the positions corresponding to the deployed position and the folded position of the blades.

5. The propulsion unit according to claim 1, wherein the nacelle is mounted stationary on the structural element of the aircraft.

6. The propulsion unit according to claim 1, wherein the nacelle is pivotally mounted on the structural element of the aircraft.

7. A method for folding the blades of the propeller of a propulsion unit according to claim 3, further comprising a folding step (E1-11) during which the blades are folded by means of the folding device, then a checking step (E1-12) of the folding, during which it is checked that the blades are indeed folded by means of the detection device.

8. The method according to claim 7, the propulsion unit further comprising a device configured to mechanically lock the movable member in each of the positions corresponding to the deployed position and the folded position of the blades, wherein if, in the checking step (E1-12) of the folding, the blades are detected as being in a folded position, the mechanical locking device is controlled to lock the blades in the folded position.

* * * * *